United States Patent

[11] 3,590,245

[72] Inventors: Hajimu Oonishi, Sakurai-shi; Osamu Yamamoto, Hirakata-shi; Tadaoki Yamashita, Hirakata-shi; Hidetsugu Kawabata, Nagata-ku, Kobe; Saburo Kitamura, Fushimi-ku, Kyoto; Yutaka Higashida, Nishinomiya-shi, all of, Japan
[21] Appl. No.: 850,705
[22] Filed: Aug. 18, 1969
[45] Patented: June 29, 1971
[73] Assignee: Matsushita Electric Industrial Co., Ltd. Osaka, Japan
[32] Priority: Aug. 20, 1968
[33] Japan
[31] 43/60154, 43/60155, 43/60156 and 43/60157

[54] METHOD AND INSTRUMENT FOR READING OUT THERMOLUMINESCENCE
8 Claims, 4 Drawing Figs.

[52] U.S. Cl. .................................................. 250/71 R
[51] Int. Cl. ..................................................... G01t 1/11
[50] Field of Search ....................................... 250/71, 71.5; 126/110

[56] References Cited
UNITED STATES PATENTS

| | | | |
|---|---|---|---|
| 2,588,086 | 3/1952 | Cole | 126/110 X |
| 3,141,973 | 7/1964 | Heins et al. | 250/71 |
| 3,300,643 | 1/1967 | McCall | 250/71.5 |

Primary Examiner—James W. Lawrence
Assistant Examiner—Davis L. Willis
Attorney—Stevens, Davis, Miller & Mosher ABSTRACT: A method of reading out the dosage of radiation to which a dosimeter was previously exposed, by blowing hot air against the exposed dosimeter to heat the same and reading out the dosage of radiation from the thermoluminescence emitted by said heated dosimeter, and an instrument for practicing the above-described method, said method and said instrument being capable of reading out the thermoluminescence of a dosimeter in a simple manner with high reliability and accuracy, irrespective of the shape of dosimeter.

METHOD AND INSTRUMENT FOR READING OUT THERMOLUMINESCENCE

The present invention relates to a method and instrument for reading out the dosage of thermoluminescence, which are more reliable and more sensitive, and are capable of reading out the dose of thermoluminescence in a shorter period of time than a conventional method and instrument.

It is said that thermoluminescence dosimetry system has a number of advantages over a conventional dosimetry system and overcomes a majority of the drawbacks possessed by the latter. The thermoluminescence dosimetry system is composed essentially of a radio-sensitive thermoluminescence dosimeter and a readout instrument for detecting the thermoluminescence of said dosimeter at an elevated temperature, and is used for determining a dosage to which a dosimeter has been exposed, by heating the exposed dosimeter in the instrument to read out the thermoluminescence emitted by said dosimeter and indicating the thermoluminescence output upon converting it into the dosage. A structural feature of such an instrument resides in a heating portion wherein the dosimeter is heated. The construction and the function of the heating portion have a direct bearing on the reliability of the dosimetry system.

In conventional thermoluminescence readout instruments, the following methods have been used for heating a dosimeter: Namely, 1. An electric resistor is combined with a dosimeter. 2. A dosimeter is closely attached to an electric resistor provided in a readout instrument. 3. A dosimeter is held close to an electric resistor provided in a readout instrument. For instance, a dosimeter is inserted in a coil-shaped electric resistor. 4. A dosimeter is inserted onto a heated hot solid. However, none of the methods described above are entirely satisfactory, because method (1) has the disadvantage that the dosimeter is complicate in shape and inconvenient in handling; the method (2) has the drawbacks that uneven temperature rise will occur depending upon the manner of attaching the dosimeter intimately to the electric resistor, resulting in a reading error and further that the heat radiation emitted by the electric resistor causes a noise; method (3) is disadvantageous in respect of S/N ratio and readout time as a lengthy time is required for temperature elevation; and method (4) has the same problem as involved in method (2). Therefore, an instrument which is convenient for use and highly reliable, could not be obtained by resorting to any one of these methods. It is particularly important to note that a failure in heating the dosimeter for reading the thermoluminescence is absolutely not permitted in the light of such property of thermoluminescence dosimeter that the record of dose of the dosimeter proper will be lost, once the dosimeter has been heated.

The present invention contemplates providing a dosimetry system of a type different from that of the conventional ones, which is characterized by the fact that a dosimeter is heated by heated air blown thereagainst. The thermoluminescence readout instrument according to the invention achieves many advantages which have not been obtainable with any one of the conventional instruments, such as that the reliability and sensitivity can be enhanced, that the heating and reading out time can be shortened and that a dosimeter of any shape can be heated.

These and other advantages and features of the present invention will become more apparent from the following detailed description when taken in conjunction with the accompanying drawings, in which.

Figure 1:
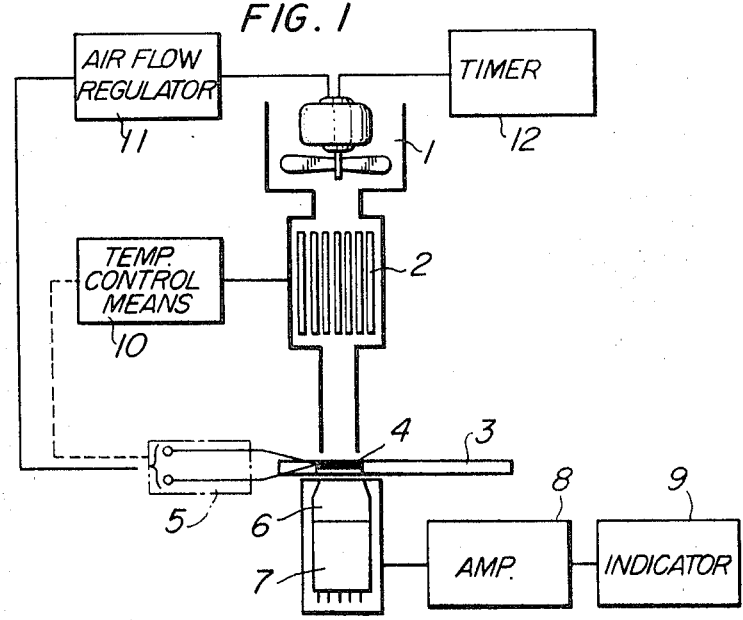
FIG. 1 is a block diagram of an embodiment of the instrument according to the present invention.

Referring first to FIG. 1, there is shown the overall layout of the thermoluminescence readout instrument according to the present invention. In FIG. 1, reference numeral 1 designates a fan for supplying air at room temperature into a heater and thence to a dosimeter, 2 the heater for heating the air supplied by the fan 1, 3 a slide for carrying the dosimeter thereon from the outside of the instrument to a heating position, 4 the dosimeter of which the dosage of thermoluminescence is to be readout and 5 a temperature detector disposed in the proximity of the dosimeter for detecting the ambient temperature of said dosimeter.

The air supplied by the fan 1 is heated by the heater 2 and blown against the dosimeter. The dosimeter is thus heated to a temperature from 200° to 400° C in about 10 seconds and emits thermoluminescence. The thermoluminescence thus produced is collected by an optical system 6 and received by a photomultiplier 7. The resultant photocurrent is amplified by an amplifier 8 and indicated by an indicator 9. In addition to the elements described above, the instrument is provided with temperature control means 10 for controlling the temperature of the heater 2, airflow rate regulator 11 for regulating the flow rate of the air and a timer 12 for the fan 1.

Figure 2:
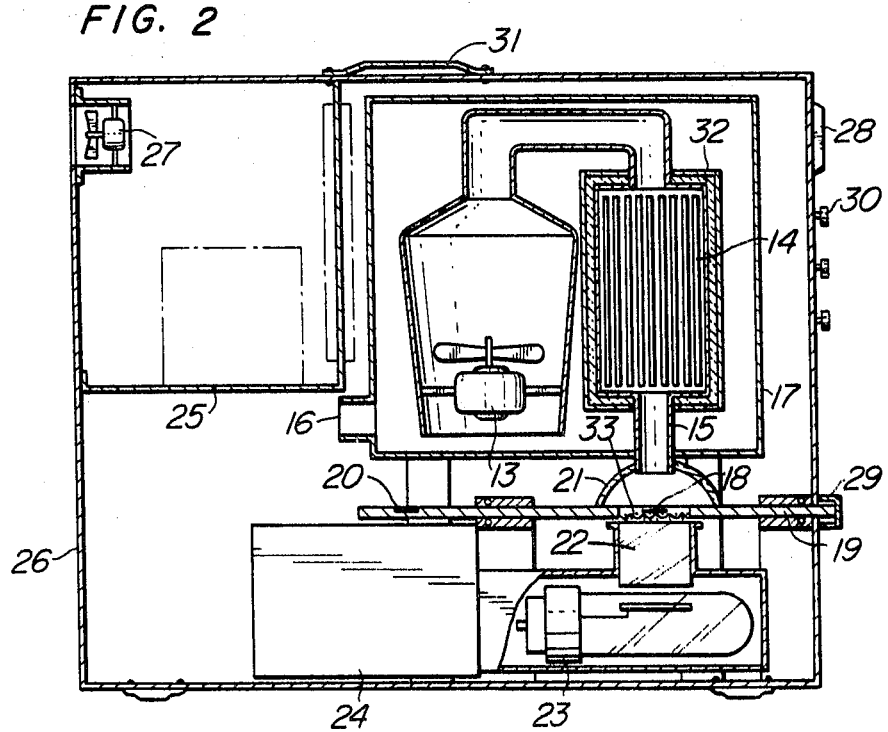
FIG. 2 is a cross-sectional side view of the essential portion of the instrument.

In order that the instrument of the present invention may be more clearly understood, the heating portion of the instrument will be described in further detail hereunder with reference to FIG. 2. In FIG. 2, there is shown the construction of the heating and thermoluminescence detecting system in cross section. Namely, reference numeral 13 designates a fan, 14 a heater and 15 a guide for heated air which is made of a material having small heat capacity and small heat conductivity. All of the aforesaid elements are accommodated in a closed container 17 having an air filter 16. Reference numeral 18 designates a dosimeter and 19 designates a slide plate for carrying the dosimeter 18 thereon. Reference numeral 20 designates a calibration light source consisting of a radioisotope and a fluorescent material, said calibration light source being located in a dosimeter heating position when the slide is drawn out or the dosimeter is located exterior of the instrument, to calibrate the sensitivity of the optical and electrical systems as a whole. Reference numeral 21 designates a concave lens, 22 a condensing lens, 23 a photomultiplier, 24 a preamplifier, 25 a supporting plate for mounting the electric parts of said preamplifier, 26 an outer casing having a large number of vent holes formed therein, 27 an ventilating fan, 28 a dose indicator, 19 a slide plate, 29 a handle, 30 operating knobs and 31 a handle of the outer casing 26.

With reference to the fan first of all, use is made of a propeller fan of relatively large wind pressure. The fan must be capable of producing a large wind pressure because the heating portion provides a resistance to the air blown by the fan, and the full-closed pressure thereof must be 2 cm. or greater in terms of water column. The flow rate of the airstream must be 5 to 10 l./min. A higher wind pressure may be obtained by using a pump. However, use of a pump has the disadvantage of the air blowing portion becoming heavy in weight, because pump is small in wind pressure and a small pump is incapable of creating a flow rate of 5 to 10 l./min. Functionally, however, use of a pump suffices for the purpose.

In the embodiment shown, there is arranged such that air at room temperature is blown by the fan, but alternatively the entire airflow system may be designed in such a manner that the hot air, once blown against the dosimeter, is cycled back to the fan for reuse. Such arrangement is advantageous in promoting the heating efficiency of air as well as in preventing a temperature rise of other portions of the instrument.

As regards the air used, the air to be blown against the dosimeter must be clean for the purpose of avoiding contamination of the dosimeter and the optical system. To this end, an air filter is provided at an air inlet and an air outlet of the airflow system. Since the air filter creates a resistance to the airflow, the volume of air at the air inlet portion of the fan is made large. In other words, an air pocket is formed successively to the air filter so that the resistance to air may be reduced in the instantaneous blowing of air. The resistance to air may also be reduced by arranging such that the air blown against the dosimeter is recycled to the air inlet for the fan. Cycling of the air is also effective in promoting the efficiency of heating the air and in maintaining the purity of the same.

As regards the heater, the temperature of the heater, the heat capacity of the heating portion, the heat conductivity of the heater, the resistance to air and the maintenance of heat of the heater as a whole, must be considered in designing the heater. The required temperature of the heater is from 300° to 500° C. and is about 100° C. higher than the temperature of the dosimeter. When the temperature of the heater is higher, heating of the air can of course be attained more easily but, in this case, the heater will generate a heat radiation which causes an error in reading the thermoluminescence. In order to heat the air efficiently while maintaining the heater at a relatively low temperature, the heater is provided with a number of fins so as to increase the contact area with air and to minimize the resistance to the airflow. In the embodiment shown, aluminum fins are provided on the heater consisting of an electric resistor to heat the air. The heat capacity of the aluminum fins must be large enough to store a quantity of heat required for reading the thermoluminescence of one dosimeter and the thickness thereof must be on the order of about 1 mm. The heater of the structure described above is enclosed by a heat insulating material 32 to prevent dissipation of the heat to the outside.

A conduit for the hot air must be capable of insulating heat and small in heat capacity. In the present invention, a stainless steel tube of 0.05 to 0.1 mm. in thickness is used. Likewise, members in the vicinity of the dosimeter, such as a dosimeter holding member, which are exposed to the hot air, must be of small thickness and small heat capacity.

In FIG. 2, reference numeral 33 designates a dosimeter supporting member which consists of a screen woven coarsely with a 0.2 mm. diameter stainless steel wire, so as to provide for smooth passage of air therethrough and to have a small heat capacity. The dosimeter is mounted on this screen.

Although in the construction shown in FIG. 2 hot air is blown against the dosimeter from the upper side of said dosimeter, it is also possible to arrange the heating portion in such a manner that the hot air is blown against the dosimeter from one side or from the lower side of said dosimeter. However, the arrangement of FIG. 2 is advantageous in that the dosimeter can be held immovably on the slide plate under a jet of hot air or, in other words, a special jig is not required for holding the dosimeter stationarily. This is very advantageous for the continuous thermoluminescence reading-out operation. It is also to be noted that since, in this case, the optical system is provided below the heating portion, the temperature of the optical system does not substantially rise and, therefore, no special cooling device is required for said optical system.

The instrument of the present invention comprising the novel heating system of the construction described above operates in the following manner: Namely, the dosimeter is brought to the heating position by being carried on the slide plate. A zero point adjustment of the thermoluminescence reading-out system is accomplished prior to the blowing of hot air. Upon completion of the zero-point adjustment, a switch is turned on to rotate the fan or an air inlet valve is opened, whereby air is sent. The air from the fan is heated during its passage through the heater. Namely, when the aluminum fins of the heater is at a temperature, for example, of 400° C., the air is heated to a temperature of 350° to 370° C. The air thus heated is blown against the dosimeter.

The dosimeter is heated in about 5 to 15 seconds. Namely, in case, for example, of a thermoluminescence dosimeter consisting of calcium sulfate disc (containing a rare earth element as active element) having a weight of 200 mg. and a diameter of 15 mm., the dosimeter is heated to 250° C. in 5 seconds and to 300° C. in 10 seconds, when the temperature of the air is 350° C. In this case, the dosimeter stops emitting thermoluminescence in 10 seconds, so that the blowing of hot air is stopped and reading of the thermoluminescence is completed.

The suspension of the air supply can be attained by breaking the switch or closing the air inlet valve a predetermined time after commencement of the thermoluminescence reading, by means of a timer switch. Then, the dosimeter is replaced with a new one and the thermoluminescence thereof is read by the same procedure as above described.

The important feature of the instrument of this invention operated as described above is that the dosimeter is heated by blowing hot air there against. In this case, the air not only serves as a medium for heat energy but also has the property of stabilizing the thermoluminescent characteristic of the thermoluminescence dosimeter. In case of a dosimeter comprises a silicic glass component, such as a dosimeter consisting of a thermoluminescent material sealed in a glass ampule or molded with a glass binder, it has the property of emitting thermoluminescence (undesired thermoluminescence) by a cause other than radiation, i.e. by friction or ultraviolet rays. Such thermoluminescence must be eliminated because it will constitute a noise to radiothermoluminescence. The present inventors have found that a dosimeter comprising silicic glass emits least undesirable thermoluminescence when heated in air or oxygen rather than in other atmosphere, i.e. nitrogen, argon or hydrogen, and that by heating the dosimeter in air or oxygen, the dosage of thermoluminescence can be reduced to less than several tenths of that when heated in the other atmosphere. It has also been found that the undesirable thermoluminescence can be reduced by heating the dosimeter in a flowing of heated air or by blowing the heated air against the dosimeter, rather than by heating the same in a stationary air. With reference to oxygen and air, the former is advantageous in respect of undesirable thermoluminescence, but for practical purposes use of air is most desirable since heated oxygen tends to attack various parts in the instrument. The use of air is also necessitated by physical reasons.

To this point, the basic construction of the thermoluminescence readout instrument according to the present invention has been described. A few examples of practical constructions obtained by modifying the above-described basic construction will be described hereunder.

Figure 3:
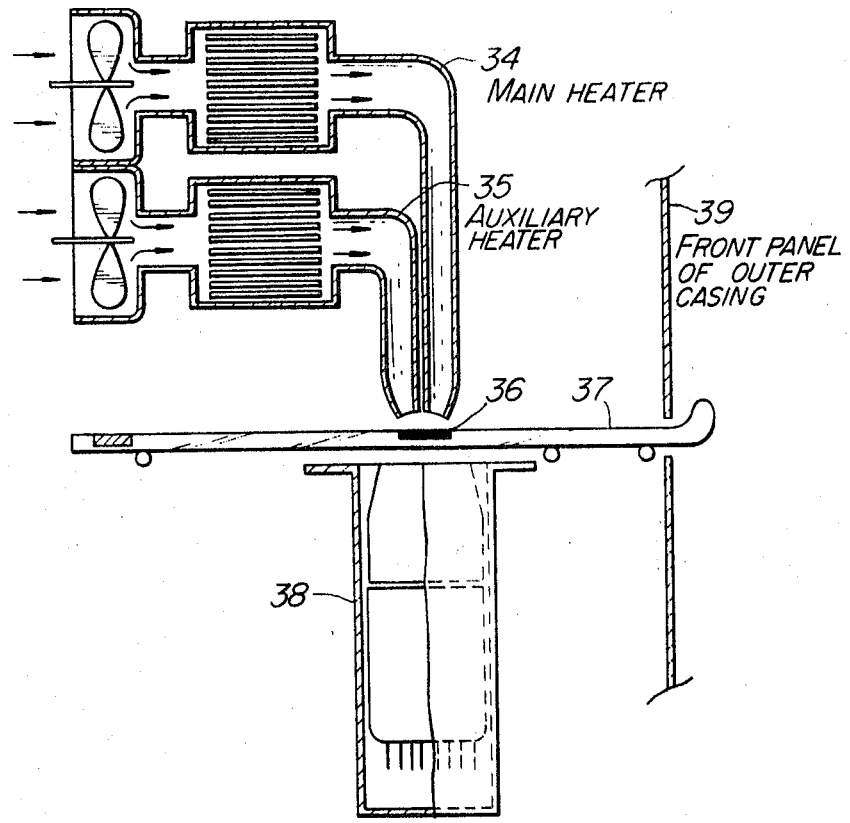
FIG. 3 is a cross-sectional side view of a different type of the dosimeter heating portion according to the invention.

In general, a thermoluminescent material generates more or less thermoluminescent glow other than the thermoluminescent glow to be used for reading the dose thereof, which should be regarded as a noise. For instance, a dysprosium-containing calcium sulfate $CaSO_4:Dy$ generates a a main glow at a temperature of 220° C. the dose of which is to be read, and another glow at a temperature of about 100° C. which should be regarded as a noise. The latter may be eliminated by preheating the exposed dosimeter for several tens seconds at a temperature of about 100° C. An embodiment of the present instrument which will be described hereunder is provided with means by which such preheating is effected. Namely, FIG. 3 shows the essential portion of a type of thermoluminescence readout instrument according to the invention, which is provided with preheating means. Referring to FIG. 3, reference numeral 34 designates a main heater and 35 designates an auxiliary heater to be used for preheating a dosimeter. Reference numeral 36 designates the dosimeter, 37 a slide for carrying the dosimeter 36 thereon, 38 a light-receiving optical system and 39 a front panel of an outer casing. The main heater is maintained at a temperature sufficiently high for causing the dosimeter to generate its main glow, that is, a temperature of 300° to 500° C. whereas the auxiliary heater is maintained at a temperature just sufficiently high for erasing an additional glow which will not be used for the readout of thermoluminescence of the dosimeter, that is, at a temperature of about 150° C. when the dosimeter consists of the above-described calcium sulfate. The exposed dosimeter 36 is at first heated at about 100° C. for a short while by hot air blown through the auxiliary heater, whereby the additional glow at a temperature around 100° C. is erased. Then, the dosimeter is heated by the hot air from the main heater in the manner as described in the preceding embodiment and the resultant thermoluminescence is read out.

Figure 4:
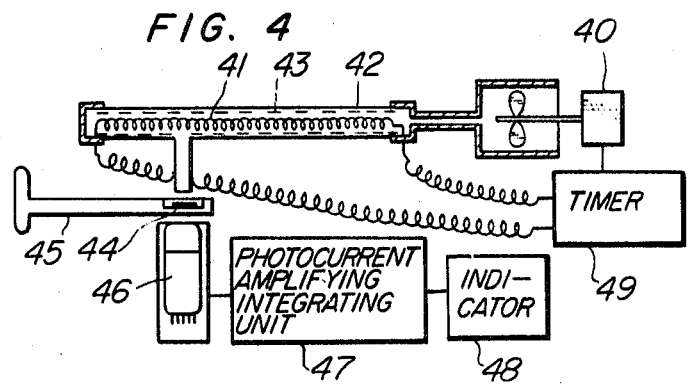
FIG. 4 is a diagram, partly in section, of another embodiment of the invention.

Still another embodiment of the present thermoluminescence readout instrument is shown in FIG. 4, which is further practical and simple in construction. The instrument shown in FIG. 4 is a simplification of the first-mentioned instrument in respect of construction and use. Referring to FIG. 4, reference numeral 40 designates a fan for blowing air, 41 a heater consisting of a spiral metallic resistance wire, 42 a cover for the heater 41, 43 a mica plate disposed in said cover 42 for insulating the same from the heater 41, 44 a dosimeter, 45 a slide, 46 a light-receiving optical system, 47 a photocurrent amplifying and integrating unit, 48 an indicator and 49 a timer for controlling the operations of the fan and the heater. Air blown by the fan is heated during its passage through the metallic resistance wire and the resultant hot air is blown against the dosimeter. In this instrument, as may be noted, the construction of the heating portion is extremely simplified. As the metallic resistance wire which is heated upon conducting a current therethrough, use is made of a nichrome wire or stainless steel wire. With this instrument, the thermoluminescence of a dosimeter is read out in the following manner: First of all, the exposed dosimeter is mounted on the slide and delivered to a thermoluminescence-generating position while being carried on the slide. After adjusting the zero point of the instrument, an on-off switch is closed to place the instrument in operation. A current is conducted through the metallic resistance wire at the same time when the fan is set in motion, so that air blown into the heater is heated and the resultant hot air is blown onto the dosimeter. Concurrently with the closure of on-off switch, the integra-circuit is energized to integrate the photocurrent created by the thermoluminescence of the dosimeter, and the timer is also set in motion. Upon passage of a predetermined time set in the timer, the switch of said timer is opened, whereby the above-mentioned integrating operation, the air-blowing operation of the fan and the air-heating operation of the heater are suspended and the value of integrated photocurrent is indicated by the indicator. By the operation described above, one cycle of thermoluminescence readout operation is accomplished.

As will be seen from the embodiments described and illustrated herein, the thermoluminescence readout instrument according to the present invention is basically characterized by the fact that the instrument employs a method wherein a dosimeter is heated by blowing hot air thereagainst. By employing such heating method, the problems possessed by the conventional instruments of this type can be solved all at once.

Specifically, by employing the heating method it is possible to heat a dosimeter constantly, no matter in what shape the dosimeter may be. Namely, it is possible to uniformly heat a disc-shaped dosimeter, a cylindrical dosimeter, a spherical dosimeter or a film-shaped dosimeter. The shape of a dosimeter is variable depending upon the purpose of use and in reading the thermoluminescence of any dosimeter by the use of the present instrument, the dosimeter can be heated at a constant rate by suitably changing the temperature and flow rate of hot air and the heating time of dosimeter in accordance with the shape of the particular dosimeter. According to the conventional heating method wherein a dosimeter is heated, for example, by conducting a large current through a metallic ribbon on which said dosimeter is tightly attached, while a thin disc-shaped dosimeter can be readily heated, a rod-shaped or spherical dosimeter can hardly be heated and a great heating error normally results. However, such problems can be eliminated according to the heating method of the present invention, using hot air. Furthermore, according to the conventional heating method the presence of even a small amount of dusts on the dosimeter or a deflection of the dosimeter results in a 100 percent or more heating error, which in turn results in a 50 percent or even greater reading error, and, therefore, an instrument resorting to such heating method is not satisfactory in respect of reliability. As contrasted, according to the present invention an error which would be caused under such circumstances can completely be eliminated and the accuracy in reading can markedly be improved.

Another important advantage of the present invention is that the heating time can be shortened to 4 to 8 seconds which is substantially shorter than that required in the conventional instruments. This can be attributed to the fact that in the present invention the dosimeter is enclosed by the hot air and hence the heat of the hot air is transferred into the dosimeter highly efficiently. Consequently, the reading time can be shortened drastically as compared with the conventional instruments.

A shorter heating time directly signifies an improved sensitivity. In case of an ordinary thermoluminescent material, the timewise value of integration of the thermoluminescence emitted thereby (the integration value of the thermoluminescence glow curve) is substantially constant, and the material emits a stronger thermoluminescence in a short period of time when heated at a higher rate. In other words, the glow curve becomes sharp as the heating rate becomes higher. The signal to noise ratio, i.e. S/N ratio, becomes larger in inverse proportion to the heating rate. This means an improved sensitivity of the instrument.

In the instruments employing the conventional heating methods, the most significant source of noise is the heat radiation generated from a heater and the sensitivity of the entire readout system is limited thereby. However, in the instrument of the present invention wherein hot air is blown against a dosimeter, the materials other than the dosimeter are heated for not elevated to a temperature to generate heat radiation even if heated), so that heat radiation will not be generated by the material other than the dosimeter. On account of this, the dose of heat radiation generated is extremely small and the S/N ratio can be improved 3 to 8 times as compared with those of the conventional instruments. Namely, the instrument of the present invention has high sensitivity.

A further important merit of the present invention is that according to the present invention the undesirable thermoluminescence can be noticeably lessened in reading the thermoluminescence of a dosimeter comprising a silicic glass component. To eliminate the undesirable thermoluminescence is nothing but to improve the reliability and to improve the accuracy of the instrument.

In comparing the conventional method wherein a dosimeter is attached to a heating element, with the method of this invention wherein hot air is blown against a dosimeter, the latter is advantageous over the former in that in the latter an optical reflector can be located adjacent the dosimeter, because less optical obstacles are present around the dosimeter, and consequently the thermoluminescence emitted by the dosimeter can be condensed in high efficiency. This means that the thermoluminescence of the dosimeter can be read out at a high sensitivity. The experiment conducted by the present inventors, using a thermoluminescence dosimeter sealed in a glass ampule having a diameter of 1.5 mm. and a length of 10 mm., has revealed that with the instrument of the present invention, comprising a concave reflector, the thermoluminescence of the dosimeter can be taken out in a dose about five times as large as that which can be taken out with the conventional instrument of the type in which a dosimeter is held in contact with a heating element and which is not provided with a concaved reflector.

In addition to the advantages set forth above, the present invention employing the hot air blowing method achieves such advantages that the instrument is rendered simple in construction and light in weight, and that less power is required for heating as the dosimeter is heated by hot air blown thereagainst.

As may be understood from the foregoing description, according to the present invention it is possible to obtain a thermoluminescence readout instrument which is highly reliable and highly sensitive, and is capable of reading the thermoluminescence of a dosimeter in a short period of time.

What we claim is:

1. A thermoluminescence readout instrument of the type wherein a dosimeter exposed to a radiation is heated and the dosage of said radiation is read out from the thermoluminescence emitted by said dosimeter, said instrument comprising a thermoluminescence detector, means for inserting the dosimeter into the instrument from the outside and locate the same in a thermoluminescence detecting position, a fan for blowing air and means for heating air supplied by said fan located in such a position that the dosimeter located in said thermoluminescence detecting position can be heated by the hot air.

2. A thermoluminescence readout instrument as defined in claim 1, in which means is provided by which the hot air is blown against the dosimeter for a predetermined period in each cycle of thermoluminescence readout operation.

3. A thermoluminescence readout instrument as defined in claim 1, in which said thermoluminescence detector is disposed in the lower portion of the instrument, whereas said air heating means is arranged in such a manner that the hot air is blown downwardly, and a dosimeter inserting plate for carrying the dosimeter thereon is interposed between said thermoluminescence detector and said air heating means so that said dosimeter may be heated above said thermoluminescence detector.

4. A thermoluminescence readout instrument as defined in claim 1, in which means is provided for adjusting the flow rate of the hot air so as to control the rate of temperature rise of said dosimeter.

5. A thermoluminescence readout instrument as defined in claim 1, in which means is provided for adjusting the temperature of said air heating means so as to control the rate of temperature rise of said dosimeter.

6. A thermoluminescence readout instrument as defined in claim 1, in which means is provided for preheating the dosimeter.

7. A thermoluminescence readout instrument as defined in claim 1, in which a calibration light source is provided in the thermoluminescence detecting position in association with the dosimeter inserting means and means is provided for removing said light source from said position at the same time when the dosimeter is inserted to the thermoluminescence detecting position by said dosimeter inserting means.

8. A thermoluminescence readout instrument as defined in claim 1, in which said air heating means and said fan are simultaneously connected to a power source at the beginning of each cycle of thermoluminescence readout operation and are simultaneously disconnected from said power source by a timer upon completion of each thermoluminescence readout operation.